United States Patent [19]

Helmcke et al.

[11] 3,790,780
[45] Feb. 5, 1974

[54] METHOD AND MEANS FOR VARYING THE SPEEDS OF VEHICLES MOVING ALONG A TRACK

[75] Inventors: Conrad D. Helmcke, Munich; Hans J. Wendt, Buxtehude, both of Germany

[73] Assignee: Messerschmitt-Bolkow-Blohm Gesellschaft mit beschrankter Haftung, Munich, Germany

[22] Filed: Mar. 14, 1972

[21] Appl. No.: 234,604

[30] Foreign Application Priority Data
Mar. 26, 1971 Germany.................. P 21 14 621.4

[52] U.S. Cl................... 246/187 C, 246/30, 340/33
[51] Int. Cl............................................. B60l 15/20
[58] Field of Search............ 246/30, 29, 187 C, 167; 340/31, 33, 34, 263; 343/7 A, 7 ED; 180/98

[56] References Cited
UNITED STATES PATENTS

| 3,662,328 | 5/1972 | Spivak | 340/33 |
| 3,442,347 | 5/1969 | Hodgson et al. | 343/7 ED |
| 801,049 | 10/1905 | Scholz | 246/29 R |
| 3,305,682 | 2/1967 | Bolster et al. | 246/187 C |
| 1,747,041 | 2/1930 | Alexanderson | 246/187 C |

Primary Examiner—Gerald M. Forlenza
Assistant Examiner—George H. Libman
Attorney, Agent, or Firm—Toren, McGeady and Stanger

[57] ABSTRACT

In the disclosed method and system, vehicles travelling along a track in single file transmit signals to the following vehicles and receive signals from the preceding vehicles. The information content of the transmitted signals varies with the speed of the transmitting vehicle. The information content of the received signals is also modulated by the speed of the receiving vehicle. The speed of the receiving vehicle is varied in dependence upon the signals received.

20 Claims, 5 Drawing Figures

PATENTED FEB 5 1974　　　3,790,780

METHOD AND MEANS FOR VARYING THE SPEEDS OF VEHICLES MOVING ALONG A TRACK

REFERENCE TO COPENDING APPLICATIONS

This application relates to the copending application of Conrad Helmcke and Hans J. Wendt, assigned to the same assignee as this application, Ser. No. 234,605, and filed Mar. 14, 1972. The content of that application is included herein as if fully recited herein.

BACKGROUND OF THE INVENTION

This invention relates to transport systems and particularly to methods and means for controlling of individual vehicles or objects moving sequentially along a track or path.

The term vehicle is used herein broadly to mean any object, such as a conveyance or car, whose movement along a track or path is controlled.

Commuter and intracity trains are being required to carry increasingly larger numbers of people at substantial speeds. It is possible to meet the demand for high speed, high volume transportation along tracks by densely crowding all the various track sections at the same time. Under these circumstances the safety of the vehicles on the tracks becomes a question of paramount importance. Recently, increasing numbers of so-called linear influence systems have been developed to aid in this problem. These systems control the acceleration, driving, and braking as well as the safety performance of individual cars by continuously monitoring the speeds of the cars. Signals corresponding to values of maximum speed are transmitted between the tracks and the individual cars as driving commands. The expected maximum speed for the track ahead of the car is also indicated by this system. The apparatus for generating the driving commands is arranged at central locations where overall information concerning the traffic over wide regions is available.

Such systems have the advantage over conventional systems with point-of-action light signals, in requiring shorter safety distances at danger points or at points of slow speed. The safety distance that needs to be maintained is only the braking distance determined by monitoring the velocity during the last lowest test speed. Such systems thus considerably reduce the follow time from previous systems.

However, such systems have a number of disadvantages. For example, centralizing the generation of driving commands results in relatively long delay periods between formation and transmission of driving commands. This is inherent in these systems.

Such delay periods can be conveniently disregarded in systems which are attempting 90 second follow times. However, such delays cannot be tolerated with shorter follow times, such as a few seconds, that are planned, for example, for a track carrying individual conveyances (e.g., cabin conveyances, etc.). Successful use of linear influence systems for such individual cars is doubtful, to say the least. All cars on a track attempting to operate with follow times of a few seconds must be monitored. The time available for control of each car is so short that the delays involved in centralized position finding and speed monitoring for generation of driving commands is no longer tolerable.

An object of this invention is to improve such transport systems.

Another object of the invention is to provide an automatic method of speed control, including braking and acceleration control, capable of operating with follow times of but a few seconds.

Another object of the invention is to accomplish the above without the necessity of calculating a distance to be maintained between the vehicles.

BACKGROUND OF THE INVENTION

According to a feature of this invention, the above objects are achieved, in whole or in part, by regulating the speed of each vehicle in dependence upon a signal which is transmitted from the immediately preceding vehicle and whose information content varies with the speed of the immediately preceding vehicle, and by modulating the received signal in dependence upon the speed of the vehicle being controlled.

With such a system the driving characteristics or operating characteristics of the immediately preceding vehicle determines the driving characteristics or operating characteristics of the vehicle being controlled. The density of vehicles on the track on which the vehicles move plays no part at all in this control. Thus, centralized apparatuses for producing driving commands are unnecessary.

Each vehicle or conveyance both transmits and receives a signal that depends upon its speed. Thus, information depending upon the speed of the vehicle itself and the speed of the immediately preceding vehicle is used for control of the driving and braking of each vehicle. Thus, it is impossible to have one vehicle collide with the vehicle ahead. Rather, no distance at all need be maintained between individual vehicles if they have the same weiht and move at the same speed. If, for example, one of the vehicles reduces its speed, the immediately following vehicle is automatically slowed down the same amount. Its braking action results in speed reduction of the vehicle following it.

The term "vehicles" as used herein is to be understood generally as any moving object controlled by this system.

According to another feature of the invention the intensity of the transmitted signal varies inversely with the speed of the transmitting vehicle. The intensity reaches a maximum when the transmitting vehicle stands still and a minimum at maximum speed. The sensitivity of the receiver in the immediately following vehicle that receives this transmission varies with the speed of the receiving vehicle. Also, preferably, it maintains a minimum sensitivity at standstill and a maximum sensitivity at maximum speed.

According to another feature of the invention, the received signal is compared with a control value that varies with the speed of the receiving vehicle, that is the vehicle that follows the transmitting vehicle. When the control value exceeds the signal, the vehicle is slowed down. As a result, the given distance is automatically maintained between the vehicles.

The intensity of the received signal and the sensitivity of the associated receiving device can be regulated down to zero, even a zero distance is possible between the vehicles, both at standstill and at maximum speed.

According to another feature of the invention, the transmitting and receiving powers are selected for all the transmitters and receivers so that the respective receivers can receive signals only from the vehicle directly ahead of the vehicle carrying the receiver, or to respond to such signals.

According to another feature of the invention, each vehicle is equipped with a transmitter and receiver whose transmitting and receiving powers depend upon the speed of the vehicle carrying them.

According to another feature of the invention, these transmitters and receivers operate with electromagnetic waves.

According to yet another feature of the invention, they transmit and receive sound waves.

According to yet another feature of the invention, the transmission and reception is accomplished by other than wireless transmission and utilizes the track itself.

These and other features of the invention are pointed out in the claims. Other objects and advantages of the invention will become known from the following detailed description when read in light of the accompanying drawings.

DESCRIPTION OF PREFERRED EMBODIMENTS

Figure 2:
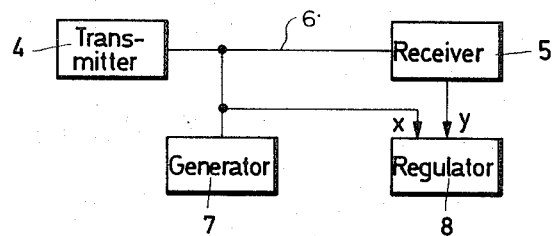
FIG. 2 is a block diagram of a driving and braking control system embodying features of the invention and used on each of the cars in FIG. 1.

In the following description it should be noted that the control illustrated in FIG. 2 is provided in each of the cars, although only the apparatus used in one car is illustrated.

Figure 1:
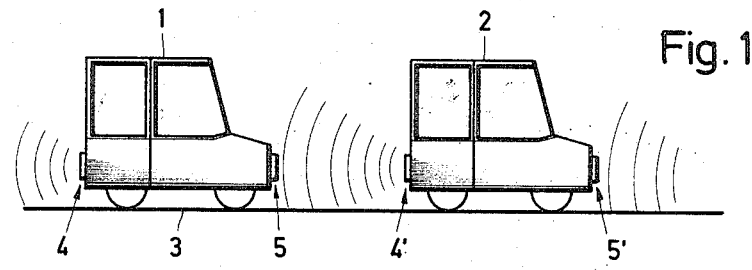
FIG. 1 is a side view illustrating a system embodying features of the invention and including two cars arranged on a track, one behind the other.

In FIG. 1, two cars 1 and 2 travel one behind the other in single file along a track 3. The cars 1 and 2 represent the individual conveyances or transports of a commuter system in which each car commutes automatically without stop between a departure station and a target station. The cars 1 and 2 are just two of many cars, not shown, travelling along the same track. When these cars move at the same speed, it is impossible for one to collide with the other. Consequently, it is possible to drive these cars in train formation, that is with zero distance or close to zero distance between them. As a rule, however, this speed cannot be maintained in all cars. Operational jams may be caused, for example, by the failure of some cars. For this reason, an automatic driving and braking control is provided in each car.

In FIG. 1 the car 1 carries a transmitter 4 and a receiver 5. The car 2 carries a transmitter 4' and a receiver 5'. According to one embodiment of the invention, the transmitters and receivers transmit and receive electromagnetic waves which are symbolically illustrated. According to another embodiment of the invention, these electromagnetic waves are light waves. According to another embodiment of the invention the transmitters and receivers transmit sound waves.

According to a preferred embodiment of the invention, identical antennas are mounted for all of the transmitters and receivers 4,4' and 5,5'. The preferred antennas are pot shell armature antennas which can be rotated along curves.

Each transmitter 4 and 4' is associated with only one receiver, namely with the receiver in the car directly following it. Of the transmitters 4,4' and receivers 5,5' in FIG. 1, only those transmitters and receivers, 4' and 5 between the two cars 1 and 2 are associated with each other. The receiver associated with the transmitter 4 of the car 1 is not illustrated. The transmitter for the receiver 5' of the car 2 is also not illustrated.

In FIG. 2, a common control line 6 connects the transmitter 4 and receiver 5 of the following car 1 in FIG. 1. A modulation generator 7 which responds to the speed of the car 1 modulates the transmitting power of the transmitter 4 inversely with the speed of the car and modulates the sensitivity of the receiver 5 directly with the speed of the car. Thus, when the car 1 stands still, the transmitting power attains a maximum and the receiver sensitivity a minimum. When car 1 travels at its maximum speed, the transmitting power reaches its minimum and the sensitivity a maximum. The modulation generator 7 produces a voltage varying with the speed of the car 1. The generator, according to an embodiment of the invention, is coupled to and driven by the wheel of the car 1.

The output voltage of the generator 7 also serves as a control valve for a regulator 8 associated with the drive system (not shown) of the car 1. The signal received by the receiver 5 serves as a guide quantity $y$ applied to regulator 8. This guide quantity varies not only with the speed of the "receiving end" car 1, but also with the speed of the transmitting car 2 and the distance between the two cars 1 and 2. As mentioned above, the power of the transmitter 4' of the transmitting car 2 also varies inversely with its speed.

If the comparison of the control value $x$ with the guide value $y$ shows that the guide value $y$ has been exceeded, the following car 1 is automatically slowed down either by reducing the power applied thereto or by applying brakes. That the guide quantity $y$ is exceeded thus always indicates that the car 1 has a higher speed than the car 2 ahead of it, and the distance between the two cars 1 and 2 is too small for the difference in the speeds. If a collision of one car with the other is to be avoided, the following car must reduce its speed. The cause of the differences in speed may, for example, be the fact that the car 2 has stopped or has reduced its speed.

The regulator 8 controls the speedup and slowdown of the car 1 so that the car 1 assumes the speed of the car ahead of it. If the speed drops below the guide quantity $y$, the car is accelerated again. Since the reaction and delay period from the time the beforementioned signal is received to the start of the braking is very short, both cars 1 and 2 as well as those not shown following them can move with practically "zero" spacing between them, or at least follow each other at extremely short distances.

According to another embodiment of the invention, apart from the above-mentioned transmitters 4 and 4' and receivers 5 and 5', additional stationary transmitters and receivers are arranged along the track 3. The external transmitters can simulate a car that moves ahead at a reduced speed. It will then automatically reduce the speed of the cars moving along the track. Such control of the cars is particularly desirable near switches or branching points, and hence ahead of entrances to and exits from the track. The external receivers serve to determine the speed of the individual cars.

According to another embodiment of the invention, the transmission of signals is not of the wireless transmission type. This applies to the transmission of signals between the cars and the external transmitters and receivers. According to this embodiment, the transmitters and receivers ar coupled to wave guides which are laid along the track. These wave guides form slotted tubular conductors. The probes of the cars are introduced into these slotted tubular conductors. Preferably the introduction into the slotted tubular conductors is contact-free. The probes then serve as antennas for the transmitters and receivers.

According to another embodiment of the invention, ordinary conductors are used instead of the tubular conductors. In this case the signals are transmitted inductively between the conductors and the transmitters and receivers of the cars. The signals may also be transmitted conductively with brushes.

According to another embodiment of the invention, the transmitters and receivers operate with light waves. Each car is provided with a tail light that serves as the transmitter and a light sensor that serves as the receiver. The brightness of the tail light and the sensitivity of the light sensor are controlled in dependence on the speed of the car carrying them.

According to another embodiment of the invention, the same procedure is used with transmitters and receivers operating with sound waves or ultrasonic waves.

For safety reasons, according to yet another embodiment of the invention, several transmitters and receivers are mounted on each car, for example two may be mounted on each car. They are coupled to each other over so-called comparators. The cars may run on rails. However, according to another embodiment of the invention, the cars constitute conventional motor vehicles moving along the same track or lane. This applies particularly to traffic on limited access highways or "Autobahnen." The system and method according to the invention applies to all objects which pass over the same track or path with short distances between them without colliding with each other, for example, objects of a conveyor system for the transfer of goods.

The amplitude of each signal received by each receiver 5 and 5' depends also on the distance between the vehicles 1 and 2, because the power of each signal diminishes with the distance between transmitter and receiver. Thus the vehicles are controlled not only on the basis of the speeds of the vehicles but on the distances beweeen them.

While embodiments of the invention have been described in detail it will be obvious to those skilled in the art that the invention may be embodied otherwise.

Figure 3:
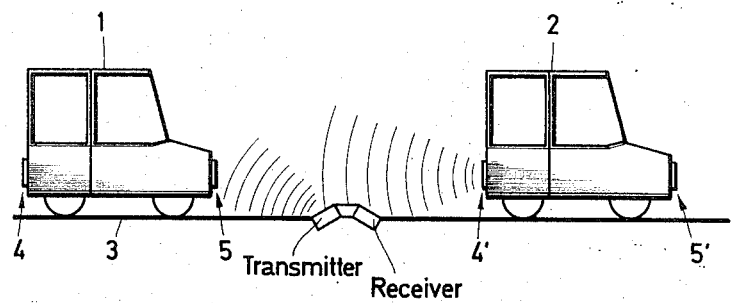
FIG. 3 is a side view illustrating a system embodying features of the invention and including two cars arranged on a track, one behind the other.
Figure 4:
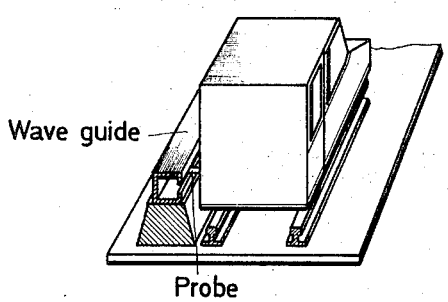
FIG. 4 is a perspective view of a car and a track together embodying features of the invention.
Figure 5:
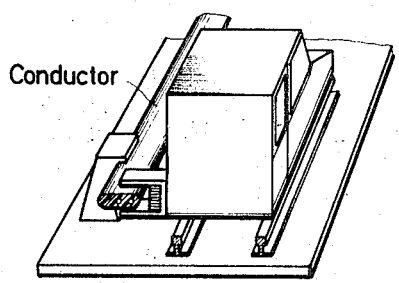
FIG. 5 is a perspective view of a car and track together embodying features of the invention.

FIG. 3 illustrates a system which includes second transmitters and receivers located at the sides of the track for the purpose of affecting the operation of the individual cars with outside signals. FIG. 4 illustrates a system utilizing a wave guide, specifically a wave guide, having a longitudinal slot with probes from the transmitters and receivers entering the slot. The probes are constructed effectively to maintain communication only between the transmitter of the forward and the receiver of the immediately following car. FIG. 5 illustrates a system similar to FIG. 4 except that a conductor extends along the track and the conductor is inductively coupled with the cars 1 and 2 as well as the remaining cars.

What is claimed is:

1. The method of controlling the speed of objects moving in a single line along a track, which comprises sensing the speed of each object, transmitting a signal from each object to the immediately following object, varying the information content of the transmitted signal on the basis of the speed of the transmitting object, sensing the signal from the immediately preceding object, varying the sensing on the basis of the speed of the object sensing the signal, and controlling the speed of the object sensing the signal on the basis of the sensed signal, the steps of varying the information content of the transmitted signal including varying the intensity of the transmitted signal inversely with the speed of the transmitting object to obtain a maximum when the transmitting object stops and to reach a minimum when the transmitting object reaches the maximum speed.

2. The method as in claim 1, wherein the sensitivity of the sensing is varied with the speed of the object sensing the signal.

3. The method as in claim 1, wherein the sensing is performed so as to create maximum sensitivity when the object sensing the signal reaches a maximum speed and minimum sensitivity when the sensing object stops.

4. The method as in claim 1, wherein the step of controlling the speed of the object includes comparing the sensed signal with the speed of the object sensing the signal and varying the speed of the object on the basis of the comparison.

5. The method as in claim 2, wherein the step of controlling the speed of the object includes comparing the sensed signal with the speed of the object sensing the signal and varying the speed of the object on the basis of the comparison.

6. The method as in claim 3, wherein the step of sensing the signal includes forming a guide quantity $y$ and the step of sensing the speed of each object includes a control quantity $x$ in the sensing object, comparing the quantity $x$ with the quantity $y$ and varying the speed of the sensing object so as to slow down the car when the quantity $y$ is exceeded by the quantity $x$.

7. The method as in claim 1, wherein the method is used in individual cars travelling along the track.

8. A system for controlling the speeds of objects travelling along a track in single file, comprising transmitter means mounted on each object for transmitting signals to the following object, receiver means mounted on each object for receiving signals from the preceding object, speed responsive means in each of said objects for producing a signal corresponding to the speed of each object along the track, control means in each of said objects responsive to said speed responsive means and coupled to said transmitter means and said receiver means for decreasing the power of the transmitted signals with increasing travel speed of the object and increasing the sensitivity of the receiver means to the received signals with increasing speed of the object, and speed regulating means on each object responsive to said receiver means on that object for controlling the speed of the object having said regulating means.

9. A system as in claim 8, wherein said regulating means includes comparator means coupled to said speed responsive means and said receiver means for comparing the output of said receiver means and said speed responsive means and controlling the speed of the vehicle on the basis of the comparison.

10. A system as in claim 8 further comprising a plurality of second transmitter means and second receiver means arranged along the track.

11. A system as in claim 13, wherein said transmitter means and said receiver means include means for transmitting and receiving electromagnetic waves.

12. A system as in claim 11, wherein said regulating means includes comparator means coupled to said speed responsive means and said receiver means for comparing the output of said receiver means and said speed responsive means and controlling the speed of the vehicle on the basis of the comparison.

13. A system as in claim 8, wherein said transmitter means and receiver means transmit and receive light waves.

14. A system as in claim 10, wherein said transmitter means and receiver means transmit and receive light waves.

15. A system as in claim 8, wherein said transmitter means and receiver means transmit and receive sound waves.

16. A system as in claim 10, wherein said transmitter means and receiver means transmit and receive sound waves.

17. A system as in claim 8, further comprising wave guide means extending along said track and coupling said transmitter means to each other and receiver means.

18. A system as in claim 17, wherein each control means controls the transmitting power of said transmitter means inversely with the speed of the object and varying the sensitivity of said receiver means with the speed of each object having said transmitter means and said receiver means.

19. A system as in claim 17, wherein said regulating means includes comparator means coupled to said speed responsive means and said receiver means for comparing the output of said receiver means and said speed responsive means and controlling the speed of the vehicle on the basis of the comparison.

20. A system as in claim 17, wherein said wave guide means form tubular conductors slotted in the longitudinal direction, said transmitter means and said receiver means extending into said tubular conductors and forming probes therein.

* * * * *